(12) United States Patent
Teichmann et al.

(10) Patent No.: US 9,325,364 B2
(45) Date of Patent: Apr. 26, 2016

(54) METHODOLOGY TO DEFINE OPTIMAL SUN POSITION USING THE CAPABILITY PROVIDED BY SMART PHONE TECHNOLOGY

(71) Applicant: Flow Control LLC., Beverly, MA (US)

(72) Inventors: Keith L. Teichmann, Newton Centre, MA (US); Leonid Toporkov, Alexandria (RU)

(73) Assignee: Flow Control LLC., Beverly, MA (US)

( * ) Notice: Subject to any disclaimer, the term of this patent is extended or adjusted under 35 U.S.C. 154(b) by 0 days.

(21) Appl. No.: 14/208,300

(22) Filed: Mar. 13, 2014

(65) Prior Publication Data

US 2014/0315599 A1  Oct. 23, 2014

Related U.S. Application Data

(60) Provisional application No. 61/779,507, filed on Mar. 13, 2013.

(51) Int. Cl.
*H04M 1/00* (2006.01)
*H04B 1/3827* (2015.01)
*H04N 5/232* (2006.01)

(52) U.S. Cl.
CPC .............. *H04B 1/3833* (2013.01); *H02S 20/32* (2014.12); *H04N 5/23229* (2013.01); *Y02E 10/50* (2013.01)

(58) Field of Classification Search
USPC .............................. 455/550.1, 566, 556.1, 557
See application file for complete search history.

(56) References Cited

U.S. PATENT DOCUMENTS

| 6,282,362 B1 | 8/2001 | Murphy et al. |
| 7,125,145 B2 | 10/2006 | Gardiner et al. |
| 7,197,829 B2 | 4/2007 | Acres |
| 7,516,557 B2 | 4/2009 | Courter |
| 7,690,123 B2 | 4/2010 | MacDonald |
| 7,760,905 B2 | 7/2010 | Rhoads et al. |
| 7,861,422 B2 | 1/2011 | MacDonald |
| 7,873,490 B2 | 1/2011 | MacDonald |

(Continued)

FOREIGN PATENT DOCUMENTS

| EP | 2509334 | 10/2012 |
| JP | 2008278001 | 11/2008 |

(Continued)

OTHER PUBLICATIONS

WO 2012/107037 English Language Abstract (1 Page).

(Continued)

*Primary Examiner* — Fayyaz Alam

(57) ABSTRACT

A smart phone for using to optimize the energy production of a solar panel in real time by a user features a signal processor to receive GPS signaling containing information about the global position of the smart phone, and input signaling containing control information to initiate a GUI algorithm in the signal processor to determine visual and/or audio cues for a user on a proper alignment of a solar panel for optimal solar energy collection efficiency; and provide display imaging signaling from a screen of the smart phone, or audio signaling from a speaker in the smart phone containing information about the visual and/or audio cues for the user on the proper alignment of the solar panel for optimal solar efficiency, so as to enable the user to simultaneously adjust the planar orientation of the solar panel having the smart phone placed thereon, based on the visual and audio cues.

37 Claims, 14 Drawing Sheets

---

A method for optimizing a solar panel in real time by a user of a smart phone, based at least partly on an algorithm 10 having at least the steps of:

10a, providing at least one command to generate input signaling to a smart phone, having a signal processor, a forward-facing camera, a forward-facing screen and a flat back surface, to initiate camera functionality in the signal processor for receiving imaging using the forward-facing camera and providing display imaging signaling from the forward-facing screen of the smart phone corresponding to the imaging received by the forward-facing camera;

10b, placing the flat back surface of the smart phone directly on a flat front surface of a solar panel of a solar device;

10c, simultaneously adjusting the planar orientation of the solar panel and the smart phone into at least two positions in order to show visual obstructions in the display imaging signaling provided from the forward-facing screen of the smart phone that may at least partly block sunlight from being received by the solar panel;

10d, selecting a position from the at least two positions in order to minimize the visual obstructions in the display imaging signaling provided from the forward-facing screen of the smart phone that may at least partly block sunlight from being received by the solar panel; and 10e, removing the smart phone from the solar panel so that the solar panel may receive the sunlight with minimal physical obstructions that may otherwise block the sunlight from being received by the solar panel in the position selected.

(56) References Cited

U.S. PATENT DOCUMENTS

| | | | |
|---|---|---|---|
| 8,095,245 B1 | 1/2012 | Mannepalli et al. | |
| 8,229,581 B2 | 7/2012 | Zalusky | |
| 8,245,155 B2 * | 8/2012 | Nakajima et al. | 715/833 |
| 8,253,086 B2 | 8/2012 | Zalusky et al. | |
| 8,282,493 B2 | 10/2012 | Roman et al. | |
| 8,285,484 B1 | 10/2012 | Lau et al. | |
| 8,290,207 B2 | 10/2012 | Lai | |
| 8,301,159 B2 | 10/2012 | Hamynen et al. | |
| 2008/0017784 A1 | 1/2008 | Hoot et al. | |
| 2008/0163504 A1 | 7/2008 | Smith et al. | |
| 2010/0000517 A1 * | 1/2010 | Zalusky | 126/600 |
| 2010/0061593 A1 | 3/2010 | MacDonald et al. | |
| 2010/0241375 A1 | 9/2010 | Kumar et al. | |
| 2010/0302363 A1 * | 12/2010 | Mackenzie | 348/135 |
| 2010/0307479 A1 | 12/2010 | Park | |
| 2011/0134268 A1 | 6/2011 | MacDonald | |
| 2011/0295575 A1 | 12/2011 | Levine et al. | |
| 2012/0007885 A1 | 1/2012 | Huston | |
| 2012/0079061 A1 | 3/2012 | Krebs | |
| 2012/0121125 A1 | 5/2012 | Dimov | |
| 2012/0197486 A1 | 8/2012 | Elliott | |
| 2012/0310427 A1 | 12/2012 | Williams et al. | |

FOREIGN PATENT DOCUMENTS

| | | |
|---|---|---|
| WO | 2010077993 | 7/2010 |
| WO | 2011011737 | 1/2011 |
| WO | 2012027726 | 3/2012 |
| WO | 2012107037 | 8/2012 |

OTHER PUBLICATIONS

JP2008278001 English Language Abstract (1 Page).

* cited by examiner

A method for optimizing a solar panel in real time by a user of a smart phone, based at least partly on an algorithm 10 having at least the steps of:

> 10a, providing at least one command to generate input signaling to a smart phone, having a signal processor, a forward-facing camera, a forward-facing screen and a flat back surface, to initiate camera functionality in the signal processor for receiving imaging using the forward-facing camera and providing display imaging signaling from the forward-facing screen of the smart phone corresponding to the imaging received by the forward-facing camera;

> 10b, placing the flat back surface of the smart phone directly on a flat front surface of a solar panel of a solar device;

> 10c, simultaneously adjusting the planar orientation of the solar panel and the smart phone into at least two positions in order to show visual obstructions in the display imaging signaling provided from the forward-facing screen of the smart phone that may at least partly block sunlight from being received by the solar panel;

> 10d, selecting a position from the at least two positions in order to minimize the visual obstructions in the display imaging signaling provided from the forward-facing screen of the smart phone that may at least partly block sunlight from being received by the solar panel; and > 10e, removing the smart phone from the solar panel so that the solar panel may receive the sunlight with minimal physical obstructions that may otherwise block the sunlight from being received by the solar panel in the position selected.

Figure 1

A smart phone 20

Signal processor or processing module 20a configured at least to:

receive global positioning satellite (GPS) signaling containing information about the global position of the smart phone, and input signaling containing control information to initiate a graphical user interface algorithm in the signal processor or signal processing module in order to determine visual cues, or audio cues, or both visual and audio cues for a user on a proper alignment of a solar panel for optimal solar energy collection efficiency; and provide display imaging signaling generated from a screen of the smart phone, or audio signaling generated from a speaker in the smart phone containing information about the visual cues, or the audio cues, or both the visual and audio cues for the user on the proper alignment of the solar panel for optimal solar efficiency, so as to enable the user to simultaneously adjust the planar orientation of the solar panel having the smart phone placed thereon, based at least partly on some combination of the visual and audio cues.

Other signal processor and/or smart phone circuits or components 20b, e.g., including input/output modules, one or more memory modules, data, address and control busing architecture, a forward-facing camera 20b1, a forward-facing speaker 20b2, a forward-facing screen 20b3, transmitter/receiver circuitry, keyboard circuitry, etc.

Figure 2

A method for using a smart phone to optimize the energy production of a solar panel in real time by a user, based at least partly on an algorithm 30 having at least the steps of:

> 30a, receiving in a smart phone global positioning satellite (GPS) signaling containing information about the global position of the smart phone, and input signaling containing control information to initiate an intuitive graphical user interface algorithm in a signal processor or signal processing module in the smart phone in order to determine visual cues, or audio cues, or both visual and audio cues, for a user on a proper alignment of the solar panel for optimal solar energy collection efficiency; and > 30b, providing display imaging signaling generated from a screen of the smart phone and audio signaling generated from a speaker of the smart phone information about the visual cues, or the audio cues, or both the visual and audio cues, for the user on the proper alignment of the solar panel for optimal solar energy collection efficiency, so as to enable the user to simultaneously adjust the planar orientation of the solar panel having the smart phone placed thereon, based at least partly on some combination of the visual and audio cues.

Figure 3

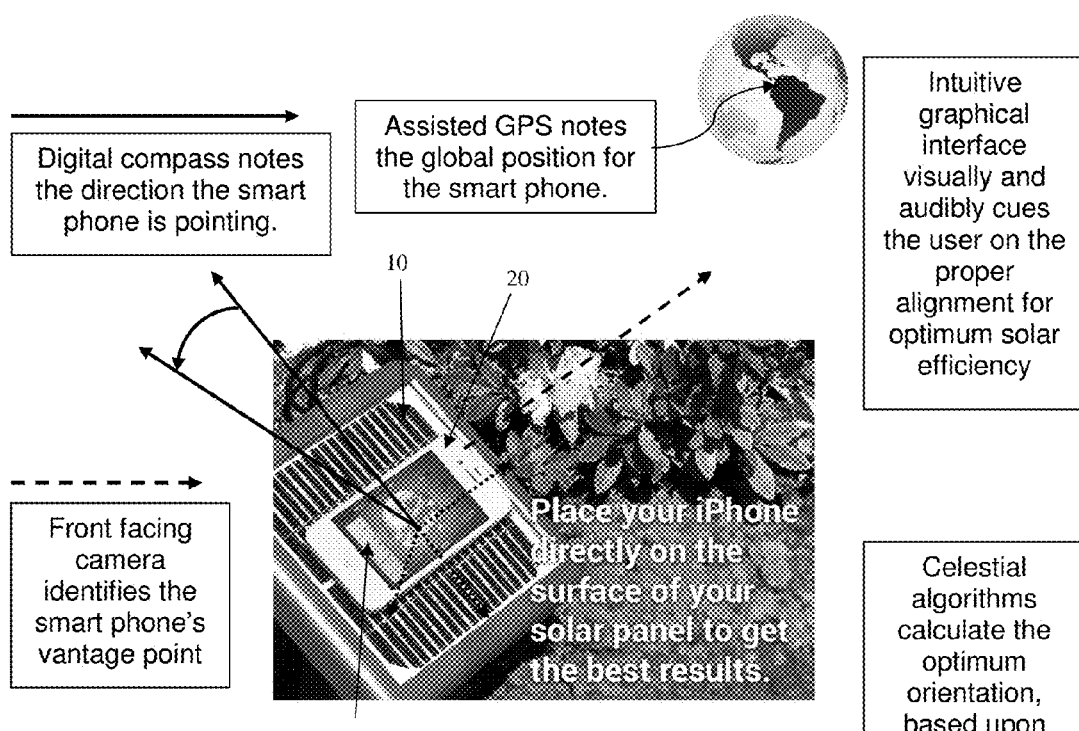
Figure 4

Figure 6: The Main Menu Screen
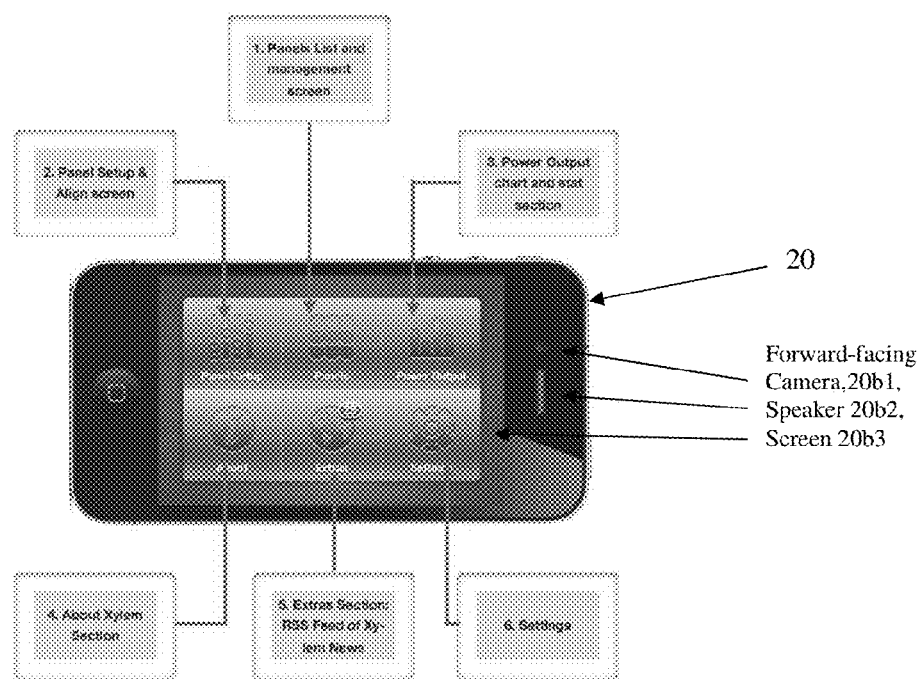

Figure 7: The Panels Screen
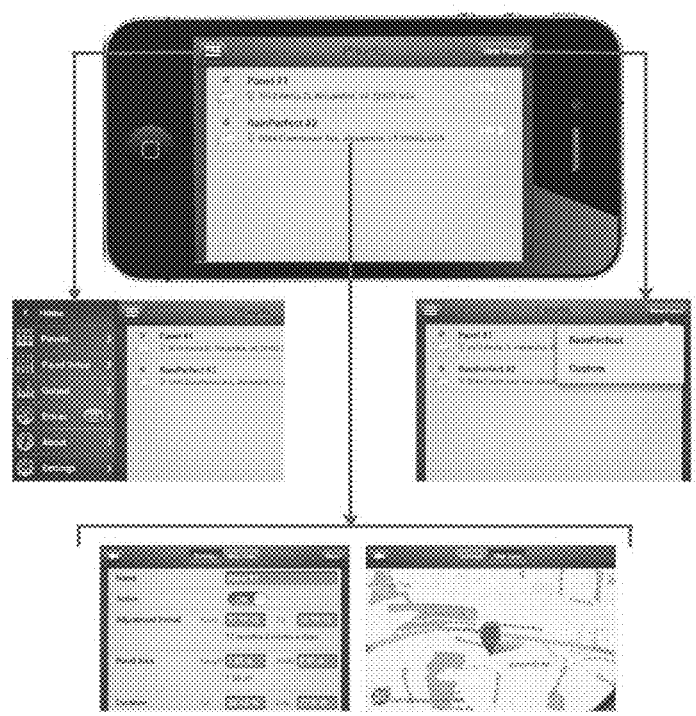

Figure 8: Panel Setup Screen
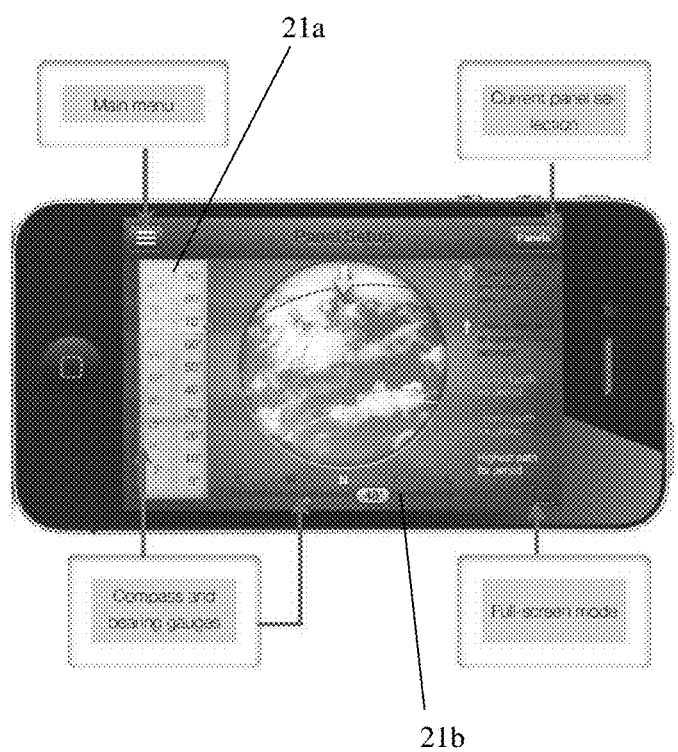

Figure 9: The Power Output Screen
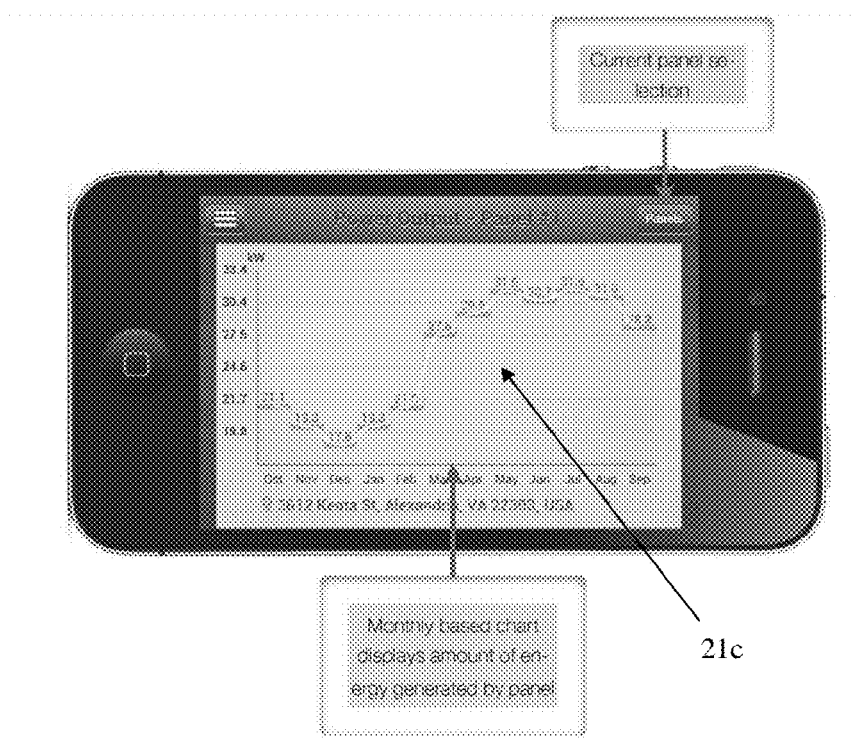

Figure 10: The Extras Screen
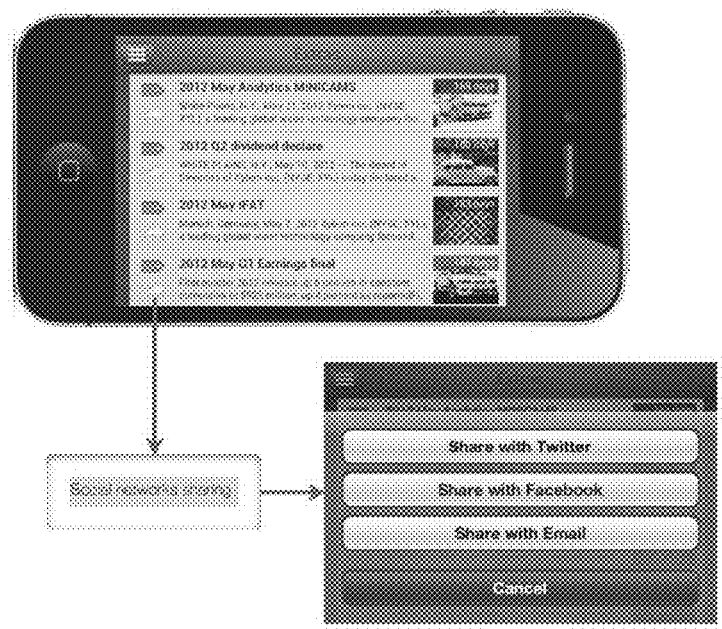

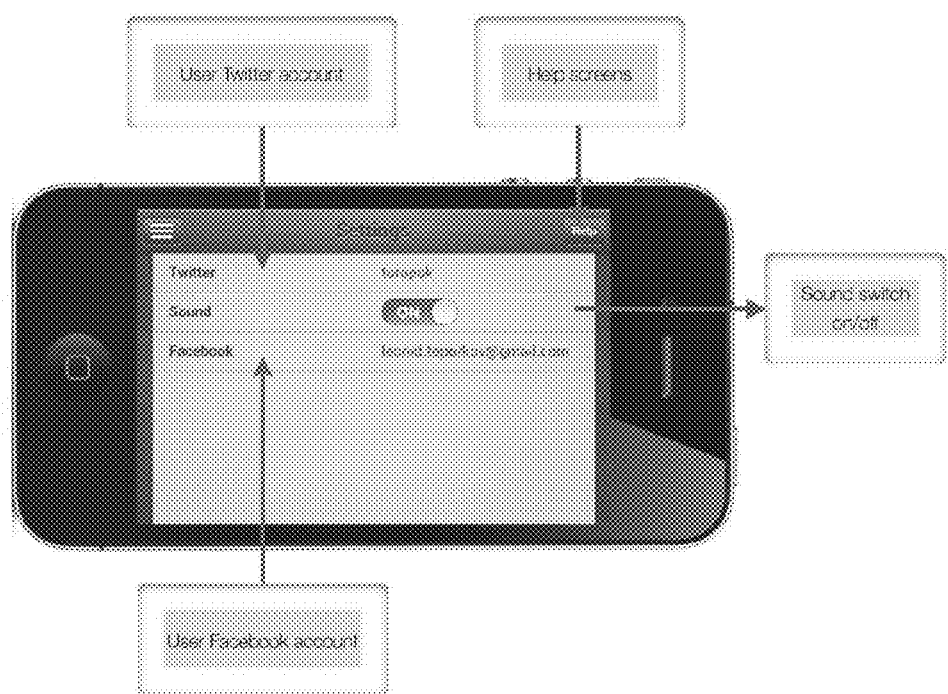
Figure 11: The Settings Screen

Figure 12: The "About" Screen
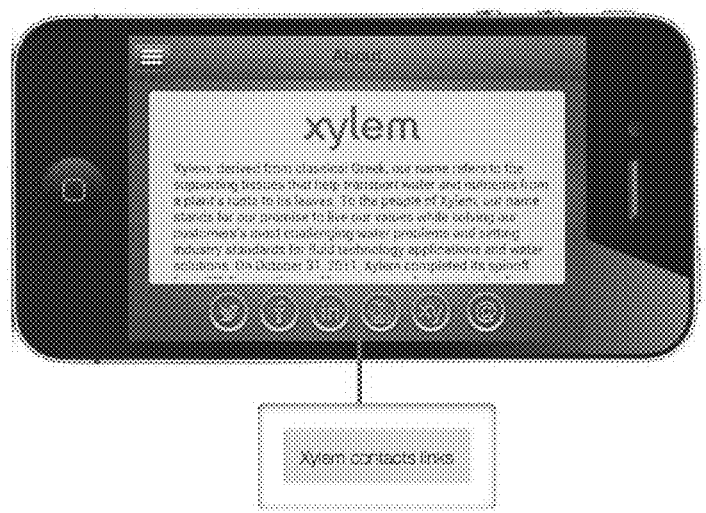

Figure 13: The Rain Barrel Application
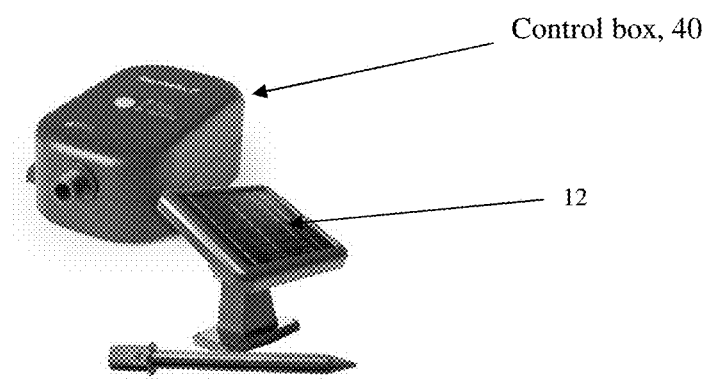
Figure 13a: The Control Box and Solar Panel
Figure 13c      Figure 13b
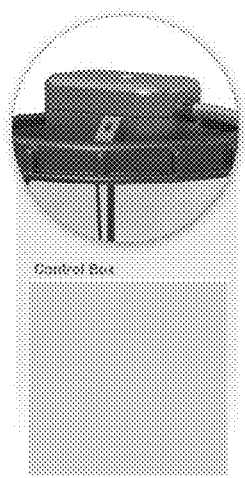 

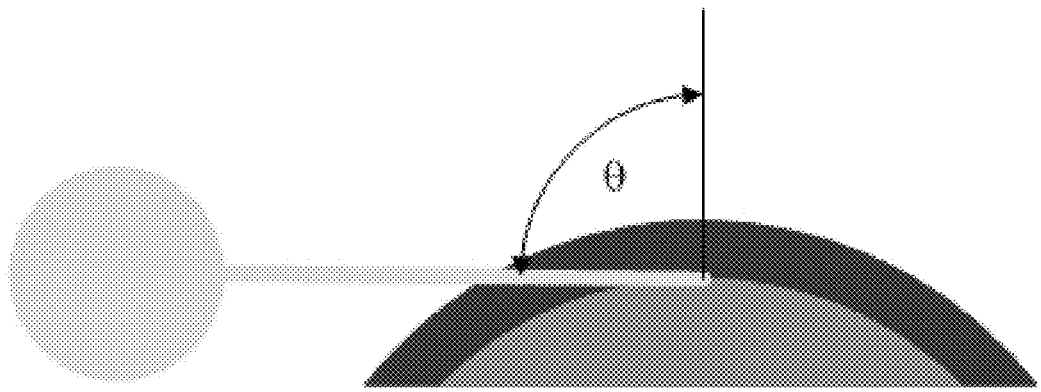
$$AM = \frac{1}{\cos(\theta)}$$
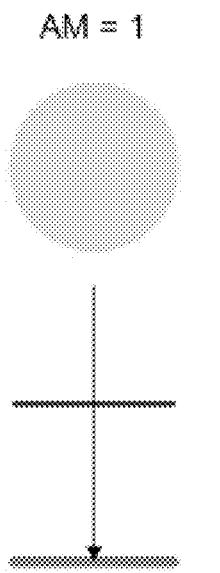
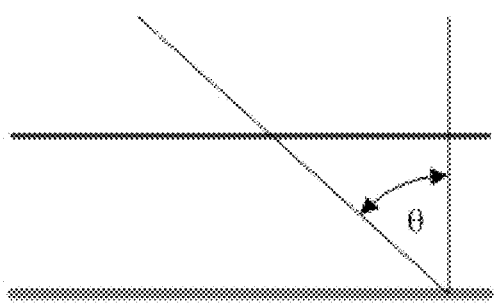
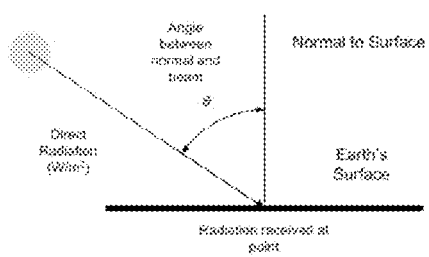
Figure 14

METHODOLOGY TO DEFINE OPTIMAL SUN POSITION USING THE CAPABILITY PROVIDED BY SMART PHONE TECHNOLOGY

CROSS REFERENCE TO RELATED APPLICATION

This application claims benefit to provisional patent application No. 61/779,507, filed 13 Mar. 2013, which is hereby incorporated by reference in its entirety.

BACKGROUND OF THE INVENTION

1. Field of the Invention

The present invention relates to a technique for orienting a solar panel; and more particularly, the present invention relates to a method and apparatus for orienting a solar panel, using Smart Phone technology.

2. Brief Description of Related Art

Current methodologies towards determining optimal sun orientation for solar panels rely upon simple algorithms or expert contractor involvement. Many solar panels remain underutilized due to inefficient orientation for particular seasons of operation. With the advent of smart phones and their internal orientation and location features, the capability now exists to incorporate expert algorithms into an individual user's digital device.

SUMMARY OF THE INVENTION

In summary, the collective capability offered by a smart phone's processor, assisted GPS, digital compass, digital gyroscope, and forward facing camera may be configured to allow a user the capability to graphically and intuitively align their solar panel for a specific location and period of time. With the present invention you can maximize how you use the sun when installing solar panels.

By way of example, the present invention lets one to expertly locate, configure, adjust and optimize their solar panel in real-time, anywhere on the globe, using a smart phone's, e.g., an iPhone's, assisted GPS, digital compass, digital gyroscope, and forward facing camera. The present invention may take the form of an app, which calculates and identifies the highest efficiency placement based on the solar panel's geographic location, orientation, and calendar duration of placement. The present invention leverages the assignee's capability with solar powered water management projects to provide a unique and optimized solution for those addressing water management needs in both developed and emerging markets. Further, the present invention provides a clean and easily articulated interface to align the assignee's so-called RainPerfect™ water harvesting pumping solution. Embodiments are also envisioned that will include an obstruction location feature whereby the forward facing camera may be used to "draw" obstructions on the screen and subsequently see the debit in power due to the obstruction's impingement on sunlight.

The Basic Method

By way of example, and according to some embodiments, the present invention may take the form of a method for optimizing a solar panel in real time by a user of a smart phone, based at least partly on an algorithm having at least the steps of:

providing at least one command to generate input signaling to a smart phone, having a signal processor, a forward-facing camera, a forward-facing screen and a flat back surface, to initiate camera functionality in the signal processor for receiving imaging using the forward-facing camera and providing display imaging signaling from the forward-facing screen of the smart phone corresponding to the imaging received by the camera;

placing the flat back surface of the smart phone on a flat front surface of a solar panel of a solar device;

simultaneously adjusting the planar orientation of the solar panel and the smart phone into at least two positions in order to show visual obstructions in the display imaging signaling provided from the forward-facing screen of the smart phone that may at least partly block sunlight from being received by the solar panel;

selecting a position from the at least two positions in order to minimize the visual obstructions in the display imaging signaling provided from the forward-facing screen of the smart phone that may at least partly block sunlight from being received by the solar panel; and removing the smart phone from the solar panel so that the solar panel may receive the sunlight with minimal physical obstructions that may otherwise block the sunlight from being received by the solar panel in the position selected.

Embodiments of the present invention may also include one or more of the following additional features:

By way of example, the method may also include one or more of the steps, as follows:

receiving in the input signaling control information to initiate a digital compass algorithm in the signal processor in order to determine the direction the smart phone is pointing; providing in the display imaging signaling generated from the forward-facing screen digital compass imaging containing information about the direction the smart phone is pointing; and simultaneously adjusting the planar orientation of the solar panel and the smart phone, based at least partly on the direction the smart phone is pointing; or receiving in the input signaling control information to initiate a digital gyroscope algorithm in the signal processor in order to determine a spatial orientation of the smart phone; providing in the display imaging signaling generated from the forward-facing screen spatial orientation imaging containing information about the spatial orientation of the smart phone; simultaneously adjusting the planar orientation of the solar panel and the smart phone, based at least partly on the spatial orientation of the smart phone; or receiving in the smart phone global positioning satellite (GPS) signaling containing information about the global position of the smart phone; receiving in the input signaling control information to initiate an intuitive graphical user interface algorithm in the signal processor in order to determine visual and audio cues for a user on a proper alignment of the solar panel for optimal solar efficiency; providing in the display imaging signaling generated from the screen and audio signaling generated from a speaker in the smart phone information about the visual and audio cues for the user on the proper alignment of the solar panel for optimal solar energy collection efficiency; and simultaneously adjusting the planar orientation of the solar panel and the smart phone, based at least partly on the visual and audio cues; or receiving in the input signaling information about a calendar duration of a placement of the solar panel, and control information to initiate a digital gyroscope algorithm in the signal processor in order to determine a spatial orientation of the smart phone; determining and identifying with the intuitive graphical user interface algorithm running in the signal processor a determined placement of high efficiency for the solar panel, based at least partly on the geographic location of the smart phone, the spatial orientation of the smart phone and the calendar duration of the placement of the solar panel; providing in the display imaging signaling generated from the screen information about the determined placement of the solar panel; and simultaneously adjusting the planar orientation of the solar panel and the smart phone, based at least partly on the determined placement of the solar panel; or receiving in the smart phone global positioning satellite (GPS) signaling containing information about the global position of the smart phone; receiving in the input signaling information about a selected time period and control information to initiate one or more celestial algorithms in the signal processor in order to determine an optimal orientation of the solar panel, based at least partly on the selected time period and a particular GPS location; providing in the display imaging signaling generated from the screen information about the optimal orientation of the solar panel; and simultaneously adjusting the planar orientation of the solar panel and the smart phone, based at least partly on the optimal orientation of the solar panel; or receiving in the input signaling information about obstructions impinging on sunlight that are drawn on the screen by the user (e.g., which correspond to visual obstructions appearing on the screen of the smart phone being viewed by the user) and control information to initiate a power calculating algorithm in the signal processor in order to determine a debit in power that would be generated by the solar panel due to the obstruction's impingement on the sunlight; and providing in the display imaging signaling generated from the screen information about the debit in power; or receiving in the smart phone global positioning satellite (GPS) signaling containing information about the global position of the smart phone; receiving in the input signaling information about one or more selected calendar dates and control information to initiate a customized power calculating algorithm in the signal processor to determine an expected power output generated by the solar panel; receiving in the signal processor internal solar irradiation database signaling containing information about solar irradiation, and panel specification signaling containing information about panel specifications of the solar panel; determining in the signal processor using the customized power calculating algorithm the expected power output generated by the solar panel, based at least partly on solar irradiation, panel specifications, geographic position, and the one or more selected calendar dates; and providing in the display imaging signaling generated from the screen information about the expected power output generated by the solar panel; or receiving in the input signaling information about a current month and day, or a total time selected, or both; determining in the signal processor using the power calculating algorithm the expected power output generated by the solar panel, based at least partly on the current month and day, or a total time selected, or both; and providing in the display imaging signaling generated from the screen information about the expected power output generated by the solar panel for the current month and day, or a total time selected, or both; or providing in the display imaging signaling generated from the screen graphs containing information about the expected power output generated by the solar panel for the current month and day, or a total time selected, or both; or receiving in the input signaling information about requesting that a main menu screen be displayed having one or more icons for initiating a graphical user interface algorithm in the signal processor related to features of the graphical user interface algorithm; and providing in the display imaging signaling generated from the screen information about the main menu screen having the one or more icons; or receiving in the input signaling information about a request to create, delete or edit one or more parameters related to the solar panel; and providing in the display imaging signaling generated from the screen information about a panel screen having panel screen icons for initiating the graphical user interface algorithm in the signal processor to create, delete or edit the one or more parameters related to the solar panel; or receiving in the input signaling information about a request for a panel setup; and providing in the display imaging signaling generated from the screen information about a panel setup screen having panel setup screen icons for initiating the graphical user interface algorithm in the signal processor to guide a user through the panel setup for determining an optimal solar panel position, based at least partly on both local geographical coordinates and a chosen time period; or receiving in the input signaling information about a selected panel, location, orientation and period of time related to the solar panel and information for initiating a power output algorithm in the signal processor to determine an estimated power output from the solar panel; determining in the signal processor using the power output algorithm the estimated power output from the solar panel, based at least partly on the selected panel, location, orientation and period of time; and providing in the display imaging signaling generated from the screen information about the estimated power output from the solar panel.

The Smart Phone

By way of further example, and according to some embodiments, the present invention may also take the form of a smart phone for using to optimize the energy production of a solar panel in real time by a user featuring:

a signal processor or signal processing module configured at least to:

receive global positioning satellite (GPS) signaling containing information about the global position of the smart phone, and input signaling containing control information to initiate a graphical user interface algorithm in the signal processor or signal processing module in order to determine visual cues, or audio cues, or both visual and audio cues for a user on a proper alignment of a solar panel for optimal solar energy collection efficiency; and provide display imaging signaling generated from a screen of the smart phone, or audio signaling generated from a speaker in the smart phone containing information about the visual cues, or the audio cues, or both the visual and audio cues for the user on the proper alignment of the solar panel for optimal solar efficiency, so as to enable the user to simultaneously adjust the planar orientation of the solar panel having the smart phone placed thereon, based at least partly on some combination of the visual and audio cues.

The signal processor or signal processing module may be configured to include one or more of the following:

receive in the input signaling information about a calendar duration of a placement of the solar panel, and information about a planar orientation of the smart phone; determine and identify with the graphical user interface algorithm running in the signal processor a determined placement of high efficiency for the solar panel, based at least partly on the geographic location of the smart phone, the planar orientation of the smart phone and the calendar duration of the placement of the solar panel; and provide in the display imaging signaling generated from the screen information about the determined placement of the solar panel in order for the user to simultaneously adjust the planar orientation of the solar panel and the smart phone, based at least partly on the determined placement of the solar panel; or receive in the input signaling information about a selected time period and control information to initiate one or more celestial algorithms in the signal processor in order to determine an optimal orientation of the solar panel, based at least partly on the selected time period and a particular GPS location; and provide in the display imaging signaling generated from the screen information about the optimal orientation of the solar panel in order for the user to simultaneously adjust the planar orientation of the solar panel and the smart phone, based at least partly on the optimal orientation of the solar panel; or receive in the input signaling information about obstructions impinging on sunlight that are drawn on the screen by the user and control information to initiate a power calculating algorithm in the signal processor in order to determine a debit in power that would be generated by the solar panel due to the obstruction's impingement on the sunlight; and provide in the display imaging signaling generated from the screen information about the debit in power; or receive in the input signaling information about one or more selected calendar dates and control information to initiate a customized power calculating algorithm for a particular solar panel in the signal processor to determine an expected power output generated by the particular solar panel; receive in the signal processor internal solar irradiation database signaling containing information about solar irradiation, and panel specification signaling containing information about panel specifications of the particular solar panel; determine in the signal processor using the power calculating algorithm the expected power output generated by the particular solar panel, based at least partly on solar irradiation, panel specifications, geographic position, and the one or more selected calendar dates; and provide in the display imaging signaling generated from the screen information about the expected power output generated by the solar panel; or receive in the input signaling information about a current month and day, or a total time selected, or both; determine in the signal processor using the power calculating algorithm the expected power output generated by the solar panel, based at least partly on the current month and day, or a total time selected, or both; and provide in the display imaging signaling generated from the screen information about the expected power output generated by the solar panel for the current month and day, or a total time selected, or both; or provide in the display imaging signaling generated from the screen graphs containing information about the expected power output generated by the solar panel for the current month and day, or a total time selected, or both; or receive in the input signaling information about requesting that a main menu screen be displayed having one or more icons for initiating a graphical user interface algorithm in the signal processor related to features of the graphical user interface algorithm; and provide in the display imaging signaling generated from the screen information about the main menu screen having the one or more icons; or receive in the input signaling information about a request to create, delete or edit one or more parameters related to the solar panel; and provide in the display imaging signaling generated from the screen information about a panel screen having panel screen icons for initiating the graphical user interface algorithm in the signal processor to create, delete or edit the one or more parameters related to the solar panel; or receive in the input signaling information about a request for a panel setup; and provide in the display imaging signaling generated from the screen information about a panel setup screen having panel setup screen icons for initiating the graphical user interface algorithm in the signal processor to guide a user through the panel setup for determining an optimal solar panel position, based at least partly on both local geographical coordinates and a chosen time period; or receive in the input signaling information about a selected panel, location, orientation and period of time related to the solar panel and information for initiating a power output algorithm in the signal processor to determine an estimated power output from the solar panel; determine in the signal processor using the power output algorithm the estimated power output from the solar panel, based at least partly on the selected panel, location, orientation and period of time; and provide in the display imaging signaling generated from the screen information about the estimated power output from the solar panel.

The graphical user interface algorithm may also be, or forms part of, an app for the smart phone.

The Method for Implementing Smart Phone Signal Processing Functionality

By way of still further example, and according to some embodiments, the present invention may also take the form of a method for using a smart phone to optimize the energy production of a solar panel in real time by a user, based at least partly on a flowchart or computer program algorithm for implementing signal processing having at least the steps of:

receiving in a smart phone global positioning satellite (GPS) signaling containing information about the global position of the smart phone, and input signaling containing control information to initiate an intuitive graphical user interface algorithm in a signal processor or signal processing module in the smart phone in order to determine visual cues, or audio cues, or both visual and audio cues, for a user on a proper alignment of the solar panel for optimal solar energy collection efficiency; and providing in display imaging signaling generated from a screen of the smart phone and audio signaling generated from a speaker of the smart phone information about the visual cues, or the audio cues, or both the visual and audio cues, for the user on the proper alignment of the solar panel for optimal solar energy collection efficiency, so as to enable the user to simultaneously adjust the planar orientation of the solar panel having the smart phone placed thereon, based at least partly on some combination of the visual and audio cues.

The method may also include one or more of the steps, as follows:

receiving in the input signaling information about a calendar duration of a placement of the solar panel, and control information to initiate a digital gyroscope algorithm in the signal processor or signal processing module in order to determine a spatial orientation of the smart phone; determining and identifying with the intuitive graphical user interface algorithm running in the signal processor a determined placement of high efficiency for the solar panel, based at least partly on the geographic location of the smart phone, the spatial orientation of the smart phone and the calendar duration of the placement of the solar panel; providing in the display imaging signaling generated from the screen information about the determined placement of the solar panel, so as to enable the user to simultaneously adjust the planar orientation of the solar panel and the smart phone, based at least partly on the determined placement of the solar panel; or receiving in the input signaling information about a selected time period and control information to initiate one or more celestial algorithms in the signal processor or signal processing module in order to determine an optimal orientation of the solar panel, based at least partly on the selected time period and a particular GPS location; providing in the display imaging signaling generated from the screen information about the optimal orientation of the solar panel, so as to enable the user to simultaneously adjust the planar orientation of the solar panel and the smart phone, based at least partly on the optimal orientation of the solar panel; or receiving in the input signaling information about obstructions impinging on sunlight that are drawn on the screen by the user and control information to initiate a power calculating algorithm in the signal processor or signal processing module in order to determine a debit in power that would be generated by the solar panel due to the obstruction's impingement on the sunlight; and providing in the display imaging signaling generated from the screen information about the debit in power; or receiving in the input signaling information about one or more selected calendar dates and control information to initiate a customized power calculating algorithm in the signal processor or signal processing module to determine an expected power output generated by the solar panel; receiving in the signal processor or signal processing module internal solar irradiation database signaling containing information about solar irradiation, and panel specification signaling containing information about panel specifications of the solar panel; determining in the signal processor or signal processing module using the power calculating algorithm the expected power output generated by the solar panel, based at least partly on solar irradiation, panel specifications, geographic position, and the one or more selected calendar dates; and providing in the display imaging signaling generated from the screen information about the expected power output generated by the solar panel; or receiving in the input signaling information about a current month and day, or a total time selected, or both; determining in the signal processor or signal processing module using the power calculating algorithm the expected power output generated by the solar panel, based at least partly on the current month and day, or a total time selected, or both; and providing in the display imaging signaling generated from the screen information about the expected power output generated by the solar panel for the current month and day, or a total time selected, or both; or providing in the display imaging signaling generated from the screen graphs containing information about the expected power output generated by the solar panel for the current month and day, or a total time selected, or both; or receiving in the input signaling information about requesting that a main menu screen be displayed having one or more icons for initiating a graphical user interface algorithm in the signal processor or signal processing module related to features of the graphical user interface algorithm; and providing in the display imaging signaling generated from the screen information about the main menu screen having the one or more icons; or receiving in the input signaling information about a request to create, delete or edit one or more parameters related to the solar panel; and providing in the display imaging signaling generated from the screen information about a panel screen having panel screen icons for initiating the graphical user interface algorithm in the signal processor to create, delete or edit the one or more parameters related to the solar panel; or receiving in the input signaling information about a request for a panel setup; and providing in the display imaging signaling generated from the screen information about a panel setup screen having panel setup screen icons for initiating the graphical user interface algorithm in the signal processor to guide a user through the panel setup for determining an optimal solar panel position, based at least partly on both local geographical coordinates and a chosen time period; or receiving in the input signaling information about a selected panel, location, orientation and period of time related to the solar panel and information for initiating a power output algorithm in the signal processor to determine an estimated power output from the solar panel; determining in the signal processor or signal processing module using the power output algorithm the estimated power output from the solar panel, based at least partly on the selected panel, location, orientation and period of time; and providing in the display imaging signaling generated from the screen information about the estimated power output from the solar panel.

Features and Advantages

In summary, the present invention let's one harness the power of the sun, e.g., including how to maximize the use the sun when installing solar panels.

The present invention lets one expertly locate, configure, adjust and optimize a solar panel in real-time, anywhere on the globe, using a smart phone's (such as an the iPhone's) assisted GPS, digital compass, digital gyroscope, and forward facing camera. It calculates and identifies the highest efficiency placement based on the solar panel's geographic location, orientation, and calendar duration of placement.

In effect, the present invention leverages the assignee's capability with solar powered water management projects to provide a unique and optimized solution for those addressing water management needs in both developed and emerging markets. Further, the present invention provides a clean and easily articulated interface to align the assignee's water harvesting pumping solution.

Future assignee product innovations, including its upcoming portable solar pumping solutions for rural small-holder farmers, will benefit from the capability to directly optimize solar panels within emerging market rural communities, unencumbered by charts or additional technical requirements.

The assignee strongly expects others engaged in rural activities in the global emerging markets to benefit as well.

Other features and benefits may include the following:

Industry leading GUI with visual and audible cues makes the present invention intuitive, interactive and accurate, no manuals needed.

the present invention's algorithms and irradiation databases don't require a live Internet connection to work, so users in the field aren't tethered by real-time connection constraints.

Celestial calculations may be used visually identify the highest sun path, lowest sun path, optimal sun path and optimum sun position based upon one's geographic location and selected calendar dates, to provide the most optimal solar panel setting.

the present invention works globally.

By way of example, using the iPhone's forward facing camera, the present invention's innovative interface identifies potential obstructions to give a trueview from the face of the optimized solar panel. By way of example, one possible implementation may take the form of:
 a) Placing the iPhone on the solar panel so the forward facing camera is imaging upwardly,
 b) Reviewing the image on the iPhone screen being taken by the forward facing camera looking for potential obstructions, and
 c) Moving the solar panel so that the image (and the solar panel) has no potential obstructions.

Alternatively, a picture could be taken, reviewed for potential obstructions, and the solar panel moved based on that reviewed.

Since the disclosure for the present invention's solar panel aligning tool appears to be tied closely to the assignee's rain harvesting pumping solution, either of the aforementioned manual (non-electronic) implementations would be appear to provide a viable technique for further enhancing the underlying technology that the present invention's solar panel aligning tool offers.

Furthermore, currently the forward facing camera is only used as a point of reference {it mirrors what the front face of the solar panel will see}. There is not an automated technique for defining obstructions. However, the capability is built in to do the following when the forward facing camera is active.

1. The forward facing camera is relaying the front image real-time {just like when you turn it on to run a video call};
2. As noted below, the program overlays images, arrows, and sun paths to queue the user to define the appropriate alignment;
3. Once the user has aligned the panel correctly {as noted by the overlayed interface} they have the option to "draw" in any obstructions;
4. The user simply traces over object which are in the sun's overlayed flight path; and
5. The program then debits the power by the % of arc which is hidden.

The process is not automated. However, the user can actively select the obstructed areas.

Other features include the following:

"Saved Panels" capability allows for naming, saving, editing, and viewing {using Apple's map utility} of multiple locations and multiple panel configurations with a single interface.

Customizable settings allow estimations for the expected panel output based upon internal solar irradiation databases, panel specifications, geographical location, and selected calendar dates.

"Power Output" graphs show the power output of the panel for the total time selected, also for current month and current day Available in at least two languages, e.g., English and German.

Available for iPhone 4, 4s, 5 and iPad 1 and 2, etc.

Available free on iTunes as a solution to both assignee's customers and solar enthusiasts.

According to some embodiments, and consistent with that set forth herein, the present invention's solar panel aligning tool may be placed on a solar panel and a program determines an arc of the sun's path based at least partly on the orientation and known global position on the Solar Panel Aligning Tool using known solar irradiation database, and displays the sun's overlayed flight path on its screen. The user may optionally trace on the screen over object which are in the sun's overlayed flight path. The program may then debit the power by the % of arc of the sun's overlayed flight path which is hidden by the user's tracing. The present invention's solar panel aligning tool does not determine elevation and azimuth angles of objects in the captured image and debit the power by the % of arc of the sun's overlayed flight path which is hidden by such objects.

BRIEF DESCRIPTION OF THE DRAWING

The drawing includes the following Figures, which are not necessarily drawn to scale:

FIG. 1 shows a block diagram of steps for implementing a method, according to some embodiments of the present invention.

FIG. 2 shows a block diagram of a smart phone, according to some embodiments of the present invention.

FIG. 3 shows a block diagram of steps for implementing a method, according to some embodiments of the present invention.

FIG. 4 includes FIGS. 4a and 4b, where FIG. 4a shows a photograph of a solar panel having a smart phone, e.g., placed directly thereon, for implementing some embodiments of the present invention; and where FIG. 4b shows an image of the Earth with an indication related to how GPS signaling can determine the global position of a smart phone. FIG. 4a includes three solid, dashed and dotted arrow types coded so that the reader can relate text associated with a respective arrow combination corresponding to the functionality of the smart phone, including direction (solid three arrow combination), vantage point (single dashed arrow) and three dimensional spatial orientation (dotted three arrow combination).

FIG. 6 shows a photograph of a smart phone having a main menu screen displayed for implementing some embodiments of the present invention.

FIG. 7 shows a photograph of a smart phone having panel screens displayed for implementing some embodiments of the present invention.

FIG. 8 shows a photograph of a smart phone having a panel setup screen displayed for implementing some embodiments of the present invention.

FIG. 9 shows a photograph of a smart phone having a power output screen displayed for implementing some embodiments of the present invention.

FIG. 10 shows a photograph of a smart phone having an extras screen displayed for implementing some embodiments of the present invention.

FIG. 11 shows a photograph of a smart phone having a settings screen displayed for implementing some embodiments of the present invention.

FIG. 12 shows a photograph of a smart phone having an "About" screen displayed for implementing some embodiments of the present invention.

FIG. 13 includes FIGS. 13a to 13c and shows a diagram of a rain barrel application, where FIG. 13a shows a control box arranged in relation to a solar panel, according to some embodiments of the present invention; where FIG. 13b shows a rain barrel having the control box arranged on its top cover and a solar panel arranged at its base for providing power to the control box; and where FIG. 13c shows a close-up view of the control box arranged on the rain barrel in FIG. 13b.

FIG. 14 includes FIGS. 14a to 14d, where FIG. 14a shows a diagram of the sun at a 90° angle in relation to the Earth's surface; where FIG. 14b shows a diagram of the sun at a 0° angle in relation to the Earth's surface (i.e., directly above); FIG. 14c shows a diagram of the sun at a 48.19° angle in relation to the Earth's surface; and FIG. 14d shows an alternative diagram of the sun at a 48.19° angle in relation to the Earth's surface.

FIGS. 1-14 are described herein using accompanying reference numerals and lead lines. To reduce clutter in the drawing, similar elements is different Figures are not all labeled with reference labels. For example, the smart phone 20 shown in FIGS. 6-12 is not labeled with a reference numeral "20" in each Figure.

DETAILED DESCRIPTION OF THE INVENTION

Figure 5:
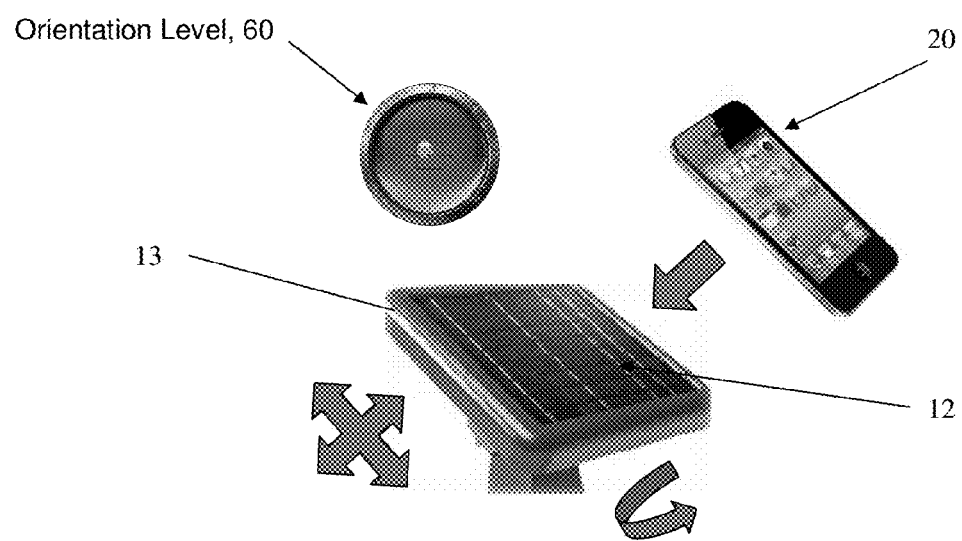
FIG. 5 shows another view of a smart phone and a solar panel and an orientation level, according to some embodiments of the present invention.

In summary, FIGS. 1-4, 13 and 14 show embodiments of the present invention in the form of two methods for optimizing a solar panel 12 in real time by a user of a smart phone 20, as well as a smart phone having signal processing functionality for implementing certain aspects of the underlying invention. In comparison, FIGS. 5-12 shows embodiments related to graphic user interface techniques that may be implemented in the smart phone and used in conjunction with the embodiments disclosed in relation to FIGS. 1-4, 13 and 14.

FIGS. 1 and 4: The Basic Method

By way of example, and according to some embodiments, FIGS. 1, 4 and 14 show the present invention in the form of a method for optimizing a solar panel 12 (see also FIG. 13a) in real time by a user of a smart phone 20, based at least partly on an algorithm 10 having at least the steps of:

10a, providing at least one command to generate input signaling to a smart phone 20 (FIGS. 2 and 4) having a signal processor 20a, a forward-facing camera 20b1 (FIG. 2), a forward-facing screen 20b3 (FIG. 2) and a flat back surface to initiate forward-facing camera functionality in the signal processor 20a for receiving imaging using the forward-facing camera 20b1 and providing display imaging signaling from the forward-facing screen 20b3 of the smart phone corresponding to the imaging received by the forward-facing camera 20b1;

10b, placing the flat back surface of the smart phone 20 on a flat front surface of the solar panel 12 of a solar device 13;

10c, simultaneously adjusting the planar orientation of the solar panel 12 and the smart phone 20 into at least two positions in order to show visual obstructions in the display imaging signaling provided from the forward-facing screen 20b3 of the smart phone 20 that may at least partly block sunlight from being received by the solar panel 12;

10d, selecting a position from the at least two positions in order to minimize the visual obstructions in the display imaging signaling provided from the forward-facing screen 12b3 of the smart phone 20 that may at least partly block sunlight from being received by the solar panel 12; and

10e, removing the smart phone 20 from the solar panel 12 so that the solar panel 12 may receive the sunlight with minimal physical obstructions that may otherwise block the sunlight from being received by the solar panel 12 in the position selected.

FIG. 2: The Smart Phone 20

By way of further example, and according to some embodiments, FIGS. 2 4 and 14 show the present invention in the form of a smart phone 20 for using to optimize the energy production of a solar panel in real time by a user featuring:

a signal processor or signal processing module 20a may be configured at least to:

receive global positioning satellite (GPS) signaling containing information about the global position of the smart phone 20, and input signaling containing control information to initiate a graphical user interface algorithm in the signal processor or signal processing module 20a in order to determine visual cues, or audio cues, or both visual and audio cues for a user on a proper alignment of the solar panel 12 for optimal solar energy collection efficiency; and provide display imaging signaling generated from a screen 12b3 of the smart phone 20, or audio signaling generated from a speaker 20b2 in the smart phone containing information about the visual cues, or the audio cues, or both the visual and audio cues for the user on the proper alignment of the solar panel 12 for optimal solar efficiency, so as to enable the user to simultaneously adjust the planar orientation of the solar panel 12 having the smart phone placed thereon, based at least partly on some combination of the visual and audio cues.

FIG. 3

By way of still further example, and according to some embodiments, FIGS. 3, 4 and 14 show the present invention in the form of a method for using a smart phone 20 to optimize the energy production of a solar panel 12 in real time by a user, based at least partly on a computer program algorithm 30 for implementing signal processing having at least the steps of:

- 30*a*, receiving in the smart phone 20 global positioning satellite (GPS) signaling containing information about the global position of the smart phone 20, and input signaling containing control information to initiate an intuitive graphical user interface algorithm in a signal processor or signal processing module 20*a* in the smart phone 20 in order to determine visual cues, or audio cues, or both visual and audio cues, for a user on a proper alignment of the solar panel 12 for optimal solar energy collection efficiency; and
- 30*b*, providing display imaging signaling generated from the screen 20*b*3 of the smart phone 20 and audio signaling generated from the speaker 20*b*2 of the smart phone information about the visual cues, or the audio cues, or both the visual and audio cues, for the user on the proper alignment of the solar panel for optimal solar energy collection efficiency, so as to enable the user to simultaneously adjust the planar orientation of the solar panel 12 having the smart phone 20 placed thereon, based at least partly on some combination of the visual and audio cues.

FIGS. 4 and 5

FIG. 4*a* shows the solar panel 12 having the smart phone 20, e.g., placed directly thereon, for implementing some embodiments of the present invention; and FIG. 4*b* shows an image of the Earth with an indication related to how GPS signaling can determine the global position of the smart phone anywhere on the surface of the Earth. FIG. 4*a* includes three solid, dashed and dotted arrow types coded so that the reader can relate text associated with a respective arrow combination corresponding to the functionality of the smart phone, including direction (solid three arrow combination), vantage point (single dashed arrow) and three dimensional spatial orientation (dotted three arrow combination).

For example, the smart phone 20 includes the forward-facing camera and associated forward-facing camera functionality in the signal processor 20*a* for providing the forward-facing camera imaging that identifies the smart phone's vantage point, as indicated by the single dashed arrow. By implementing the associated forward-facing camera functionality, the signal processor 20*a* may identifies the smart phone's vantage point, and provide in the display imaging signaling generated from the screen 20*b*3 of the smart phone 20 such information in the form of, e.g. camera imaging signals showing the visual obstructions. Algorithms for implementing a forward-facing camera and its associated forward-facing camera functionality, including in smart phones, are known in the art, and the scope of the invention is not intended to be limited to any particular type or kind thereof either now known or later developed in the future.

For example, the smart phone 20 may include a digital compass for implementing associated digital compass functionality in the signal processor 20*a* for providing the direction the smart phone is pointing in relation to a normal axis, as indicated by the solid three arrow combination, a first indicating the normal axis, a second indicating the direction the smart phone 20 is pointing in relation to the normal axis, and a third indicating the angle between the direction the smart phone 20 is pointing and the normal axis. By implementing the associated digital compass functionality, the signal processor 20*a* may determine the direction the smart phone 20 is pointing, and provide in the display imaging signaling generated from the screen 20*b*3 of the smart phone 20 such information in the form of, e.g. these three solid arrows as visual cues for the user on the proper alignment of the solar panel 12 for optimal solar energy collection efficiency. Algorithms for implementing a digital compass and its associated digital compass functionality, including in smart phones, are known in the art, and the scope of the invention is not intended to be limited to any particular type or kind thereof either now known or later developed in the future.

For example, the smart phone 20 may include a digital gyroscope for implementing associated digital gyroscope functionality in the signal processor 20*a* for providing the spatial orientation of the smart phone 20, e.g., as indicated by the three dotted arrow combination, a first indicating the X axis, a second indicating the Y axis, and a third indicating the Z axis. By implementing the associated digital gyroscope functionality, the signal processor 20*a* may determine the spatial orientation of the smart phone 20, and provide in the display imaging signaling generated from the screen 20*b*3 of the smart phone 20 such information in the form of, e.g., these three dotted arrows as visual cues for the user on the proper alignment of the solar panel 12 for optimal solar energy collection efficiency. Moreover, celestial algorithms may be used to calculate the optimum orientation based upon user inputs to the smart 20 and a selected time period, for a particular global location. Such celestial algorithms, as well as algorithms for implementing a digital gyroscope and its associated digital gyroscope functionality, including in smart phones, are known in the art, and the scope of the invention is not intended to be limited to any particular type or kind thereof either now known or later developed in the future.

By way of further example, the signal process may be configured to provide associated audio cues that correspond to, or that compliment, the visual cues. Algorithms for implementing audio commands and its associated audio command functionality, including in smart phones, are known in the art, and the scope of the invention is not intended to be limited to any particular type or kind thereof either now known or later developed in the future.

For example, the smart phone 20 may include a GPS signalling receiver for implementing associated GPS functionality in the signal processor 20*a* for providing the global position of the smart phone 20. By implementing the associated GPS functionality, the signal processor 20*a* may determine the global position of the smart phone 20, and use it in the associated GUI algorithms for determining visual cues for the user on the proper alignment of the solar panel 12 for optimal solar energy collection efficiency. GPS signalling receiver, and associated algorithms for implementing GPS functionality, including in smart phones, are known in the art, and the scope of the invention is not intended to be limited to any particular type or kind thereof either now known or later developed in the future.

For example, the smart phone 20 may include an intuitive GUI interface (e.g., which may be menu driven consistent with that set forth below) and associated intuitive GUI interface functionality for implementing in the signal processor 20*a* for providing the GUI for the user of the smart phone 20. By implementing the associated intuitive GUI interface functionality, the signal processor 20*a* may determine the proper alignment of the solar panel 12 for optimal solar energy collection efficiency, and provide in the display imaging signals visual cues for the user on the proper alignment of the solar panel 12 for optimal solar energy collection efficiency. Algorithms for implementing GUI functionality, including in smart phones, are known in the art, and the scope of the invention is not intended to be limited to any particular type or kind thereof either now known or later developed in the future.

FIG. 5 shows the smart phone 20, the solar panel 12 and an orientation level 60, which may be used in conjunction with the present invention. In FIG. 5, the arrow indicates that the smart phone 20 is to be placed on the solar panel 12.

To aid global customers of the assignee in solar power panel alignment, the inventors believe that the present invention provides or fields a compelling and innovative smart phone app.

The present invention may define proper panel alignment, noting that the panel is fixed and there is most likely an optimum alignment location {sun's position and travel}.

The present invention leverages the iPhone 4's A-GPS, digital compass, and 3 axis gyroscope.

The present invention provides an innovative and intuitive graphical user interface In effect, combining the smart phone's assisted global position {A-GPS}, direction {digital compass}, and orientation {3 axis gyroscope}, an app may be defined which aids users or customers in establishing the best optimized position {location, tilt, rotation}, simply by placing the phone on the front face of the panel and visually indicating the correct orientation as the panel is moved.

FIG. 6: The Main Menu

By way of example, FIG. 6 shows the "Main" menu screen first, directly after the application or technique set forth herein launches. This menu screen provides a unique "water effect" containing 6 buttons linked to the application's main sections. These six screens are shown, summarized below and highlighted in further detail in sections that follow below:

1. Panels: This menu selection leads to a panels management section, as shown. In this section, users may create, delete or edit parameters of solar panels. By way of example, a default set of parameters may exist or be included for some known applications, e.g., including the assignee's RainPerfect™ water harvesting pumping solution product.

2. Panel setup:—This menu section provides an innovative, interactive and real-time graphical user interface (GUI) for panel orientation. On this screen, users are guided through the setup for an optimal solar panel position, considering both local geographical coordinates and a chosen or selected time period.

3. Power output: This menu section provides an estimated power output for a selected panel, location and orientation. Based upon the specifications input provided by the user for a particular panel, this screen provides estimations for the amount of power generated by the chosen panel within a particularly selected period of time.

4. About: This menu section provides access to both the assignee's and other social media links. In particular, this panel may contain information linking to, e.g., the following: EOL Blog, EOL Twitter, EOL Facebook, EOL LinkedIn, EOL eMail address, the assignee's YouTube channel, etc.

5. Extras section: This menu section provides a visual access to, e.g., the assignee's news RSS feed.

6. Settings: This section summarizes all user selectable options for the present invention's application. In this panel, users may input, e.g., their social media (Facebook and Twitter) credentials, turn sound on or off, and access the application HELP section, etc.

The "Main" menu screen in FIG. 6 may form part of the GUI interface, according to some embodiments of the present invention.

These sections will all be described in further detail below:

FIG. 7: The Panels Screen

By way of example, FIG. 7 shows "Panels" management screen that may be used to provide a singular access source, e.g., listing all panels optimized by the present invention's application. Users may establish specifications and orientations for as many panel and location combinations as desired. This page catalogs these multiple entries in an easily accessible and clean interface. Any of these listed combinations may be viewed, re-optimized, updated, and then saved.

For example, on the "Panels" management screen, users may access any of the following functions.

1. Create Panel Objects:
      a) Users may define, name, apply panel specifications, and save multiple panel configurations. Each configuration may be unique and stored in the application's database.
      b) As noted before, customers who have purchased the assignee's RainPerfect™ water harvesting pumping solution product may select a preset for this system's panel when configuring their location.

2. Edit Object Parameters:
      a) Users may select any period for defining the optimum panel adjustment. The adjustment period will define the optimal position for the panel and subsequently define the appropriate power output chart based upon internal insolation {solar} databases. By default, the adjustment period may be 1 year. If a user wants to achieve a better more efficient panel performance, they may choose to optimize based upon a specific day, month, or season. For instance, if the assignee's RainPerfect™ product will only be used in a particular geographic region for the spring and summer months, then those particular dates may be selected and the output panel orientation will be optimized for those specific dates.
      b) Users are free to input specific panel specification and performance characteristics. These inputs relate to panel specifications {e.g., size, efficiency, etc.} and panel performance characteristics {e.g., shading loss, PowerPoint tracking loss, dust loss, etc.}. Defaults may already be included in the app based upon the typical characteristics {e.g., specifications and installation} for a commercial 220 W panel. All defaults are editable. Note that "Estimated PV power density" may be based upon the panel's efficiency and the calculated insolation at the point of operation and optimization. This value will vary based upon the user's geographic location and selected duration.
      c) Panel locations may be directly viewed using, e.g., the Apple Mapping software, included in the current iOS operating system. Users may click into a specific window which drops their optimized coordinates directly into a map view.

3. Delete Panel
      a) Particular saved panel configurations may be deleted by simply swiping across the individual entry and then selecting "delete."

The "Panels" screen in FIG. 7 may form part of the GUI interface, according to some embodiments of the present invention.

FIG. 8: The Panel Setup Screen

By way of example, FIG. 8 shows an example of an innovative panel set-up screen and its associated capability of the present invention's application. For this particular image, one may use the application to adjust the solar panel 12, e.g., for the assignee's RainPerfect™ water harvesting pumping solution product.

The "Panel Setup" section is quite simple, graphically rich, and intuitive in operation. A user simply may place the smart phone 20, e.g., an iPhone, directly on the surface of the panel 12 and start or initiate the functionality of the "Panel Setup" screen. The application graphically and audibly, e.g., via a faster increasing tone as one approaches optimum {if selected} informs the user on how to turn and/or tilt the panel 12 to achieve the optimal orientation for the current location and selected time period (default value of 1 year).

In operation, and by way of example, the app may take the selected adjustment period and divides it into a sequence of, e.g., 3 hour intervals. For each sub-period, the app calculates the vector of direction towards the sun. The summation of vectors define the sun's trajectory. Those vectors with Negative Z-coordinates (night time) are omitted. Next, each vector may be multiply with a weighting-coefficient to accommodate the amount of energy at sunrise/sunset being less than at noon-time. Finally, all resulting vectors may be summarized to obtain one "optimum" vector which defines the most efficient orientation point for the chosen period and current location.

In FIG. 8, the panel set-up screen includes imaging showing compass and bearing gauges 21a, 21b, e.g., displayed on the screen 20b3, containing visual information about compass and bearing readings.

By way of example, the steps for implementing the aforementioned algorithm may be implemented in the signal processor 20a, e.g. for determining the most efficient orientation point for the chosen period and current location, by one skilled in the art without undue experimentation.

FIG. 9: The Power Output Screen

FIG. 9 shows a "Power Output" screen that draws a monthly energy generation chart 21c for the selected panel, based upon the defined period of time, panel specifications, and local insolation {solar radiation}. Directly summarized underneath the panel are the following parameters.

1. Panel input dimensions, width and height: These dimensions may be used to define the amount of solar radiation capturable area.
2. Power: This value is taken directly from the "Panels" specifications and is provided by the panel manufacturer.
3. Efficiency: This value is taken directly from the "Panels" specifications and is provided by the panel manufacturer.
4. Total Output: This value is simply the additive summation of the noted monthly panel outputs in the chart.
5. Average Output: This value is simply the average of the noted monthly panel outputs divided by the average number of solar hours in a day {hours in which the sun is actually shining on the panel}.

The "Power Output" screen includes a current power selection icon, as shown, for selecting the current panel.

By way of example, the steps for implementing the aforementioned algorithm may be implemented in the signal processor 20a, e.g. for determining both daily energy generation for the selected panel and the monthly energy generation chart for the selected panel, by one skilled in the art without undue experimentation. The display imaging signaling would contain this information and be provided from the screen 20b3.

In addition, the smart phone 20 may include such power output functionality and one or more associated power output algorithms for implementing in the signal processor 20a for providing the power output signaling and data to generate both the daily energy generation for the selected panel and the monthly energy generation chart 21c. Such power output algorithms are known in the art, and the scope of the invention is not intended to be limited to any particular type or kind thereof either now known or later developed in the future.

The Power Calculations

It is commonly understood that the Sun delivers approximately 1370 W/m^2 of energy to the Earth's outer atmosphere. Consequently, mathematical calculations need to define how much energy will be lost in the atmosphere as one delivers solar insolation to the earth's surface. One next considers, at each point of earth, the following:

1. Different day length (hours time at which the panel actually receives sunlight).
2. Different length of path for sun beams to reach the top to surface of the panel {note the graphic below and subsequent graphics}.

By solving for these variables, one determines the amount of energy delivered to the surface of the solar panel 12. The theoretical maximum energy is now debited based upon the panel efficiency value provided by the panel manufacturer in their panel specifications. The "Panels" specification page {noted in the "Panels" section} provides the capability for additional conservatism in this power measurement by providing additional debiting factors; shadow, dust, etc. to name a few.

By way of example, formulas are within the public domain and may be located, e.g., at the following internet URL:
http://www.brightonwebs.co.uk/energy/solar_earth-_sun.htm.

FIG. 10: The Extras Screen

FIG. 10 shows an "Extras" panel, e.g., which may provide direct access to the assignee's RSS feed. As available, thumbnail images are noted next to specific feeds to highlight these particular new releases.

By way of further example, this section may also provide the capability for users to share the assignee's RSS feed items to their Twitter or Facebook accounts, further expanding Xylem's social media presence.

FIG. 11: The Settings Screen

FIG. 11 shows a "Settings" screen, e.g., which provides a single resource to set globally changeable application inputs. In particular, this section may be configured, e.g., to allow users to input both their iOS Twitter and Facebook credentials, necessary to allow direct access to these social media systems from the application. The audible alignment functionality may be turned on or off in this section. The application may allow multi-language capability, e.g., including either English or German language capability. This setting is set by the global iPhone language and, per standard iPhone operating characteristics, is not user selectable in the application.

FIG. 12: The "About" Screen

FIG. 12 shows the "About" screen, e.g., which provides direct accessibility to the assignee's social media sites. In particular, the following social media functions are accessible from this screen.

Twitter Handle: @assignee . . .

Facebook: Aquatinamics
LinkedIn: assignee's Essence of Life
The assignee's YouTube Channel
The assignee's Blog
Essence of Life eMail contact: EssenceOfLife@xyleminc.com

FIG. 13

FIG. 13a shows one particular application for the present invention, in which a control box 40 may be arranged in relation to the solar panel 12; FIG. 13b shows a rain barrel 42 having the control box 40 arranged on its top cover and the solar panel 12 arranged at its base for providing power to the control box 40; and FIG. 13c shows a close-up view of the control box 40 arranged on the rain barrel 42 in FIG. 13b.

The control box 40 includes a pump and a control circuit (not shown) for pumping water out of the rain barrel 42. The control box 40 receives power from the solar panel 12 which allows it to operate is locations where electrical power may not otherwise available. In such applications, the user may use a smart phone in order to maximize the efficiency of the solar energy collection of the solar panel 12, e.g., using the technology set forth in relation to the present invention.

FIG. 14

FIG. 14 includes diagrams of the sun at various angles in relation to the Earth's surface, and mathematical formulas for determining the angle between normal and the sun's beam, which are all known in the art and would be appreciated by one skilled in the art, and which may be used in determining one or more of the functionality set forth herein.

Example of GUI Interfaces

By way of example, the GUI interfaces that may form part of the present invention may be implemented alone, or in conjunction with, GUI technology developed by a company name Vito Technology, Inc., that has been recognized in the industry for:
  Outstanding and award winning graphical interface {App Store Hall of Fame for Star Walk}
  Demonstrated capability in integrating AGPS, Digital Compass, and 3 Axis Gyroscope
  Proven celestial modeling capability, necessary to properly chart the sun's position based upon:
    Geographic Location
    Date & Time
    iPhone orientation The Signal Processor 20a By way of example, the functionality of the signal processor 20a may be implemented using hardware, software, firmware, or a combination thereof. In a typical software implementation, the signal processor 20a would include one or more microprocessor-based architectures having, e.g., at least one signal processor or microprocessor like element 20a. A person skilled in the art would be able to program such a microcontroller (or microprocessor)-based implementation to perform the functionality described herein without undue experimentation, based at least partly on the algorithms and signal processing algorithms set forth herein. The scope of the invention is not intended to be limited to any particular implementation using technology either now known or later developed in the future. The scope of the invention is intended to include implementing the functionality of the processors 20a as stand-alone processor or processor module, as separate processor or processor modules, as well as some combination thereof.

The apparatus may also include other signal processor circuits or components 14, e.g. including random access memory (RAM) and/or read only memory (ROM) like element 20b, input/output devices and control, and data and address buses connecting the same, and/or at least one input processor and at least one output processor.

Other Applications Envisioned

The following summary provides a listing of updates "in progress" for the present invention. The scope of the invention is intended to include one or more of the same, including:
  1. User-selectable shadow area;
  2. Social media sites opening in either an application specific Safari window or the installed social media application, if available;
  3. Potential background wallpaper change; and/or
  4. Others based upon user feedback during the "soft launch."

Other Considerations

By way of example, the following is a list of some other consideration that may form part of the implementation of the present invention:
  Provide logic which defines the appropriate panel orientation,
  Define the perpendicular between the screen face and the sun's apogee,
  Provide the user the capability to define multiple panel orientations, e.g., one for each season noting that the transit of the sun will change?
  Define one, yearly optimized position? Or allow the optimization to be user selectable?
  Take into account a user input's water table specific information, including
    Water depth,
    Desired output in water flow rate, liters per minute
    Estimated operational sun days
  Screen may overlay the sun transit and note the location of the primary orientation
    Should it be VR if the user holds the screen to the sky?
    Screen should provide visual, e.g., queue's {arrows or others} noting how to change the orientation to align accordingly The Scope of the Invention It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

The scope of the invention is intended to include pumping systems to the global water, waste water, and filtration businesses.

The scope of the invention is intended to include Solar Powered pumping solutions.

Developing regions

Non-Developed rural farming communities

Systems or applications may include, or be inclusive of, pumps, panels, tubing, etc.

The assignee of the present application also sells its Rain-Perfect product that is an example of this portfolio deployment.

What we claim is:

1. A method for optimizing a solar panel in real time by a user of a smart phone, comprising at least the steps of:
    providing at least one command to generate input signaling to a smart phone, having a signal processor, a forward-facing camera, a forward-facing screen and a flat back surface, to initiate camera functionality in the signal processor for receiving imaging using the forward-facing camera and providing display imaging signaling from the forward-facing screen of the smart phone corresponding to the imaging received by the forward-facing camera;
    placing the flat back surface of the smart phone on a flat front surface of a solar panel of a solar device;
    simultaneously adjusting the planar orientation of the solar panel and the smart phone into at least two positions in order to show visual obstructions in the display imaging signaling provided from the forward-facing screen of the smart phone that may at least partly block sunlight from being received by the solar panel;
    selecting a position from the at least two positions in order to minimize the visual obstructions in the display imaging signaling provided from the forward-facing screen of the smart phone that may at least partly block sunlight from being received by the solar panel; and
    removing the smart phone from the solar panel so that the solar panel may receive the sunlight with minimal physical obstructions that may otherwise block the sunlight from being received by the solar panel in the position selected.

2. A method according to claim 1, wherein the method comprises:
    receiving in the input signaling control information to initiate a digital compass algorithm in the signal processor in order to determine the direction the smart phone is pointing;
    providing in the display imaging signaling generated from the forward-facing screen digital compass imaging containing information about the direction the smart phone is pointing; and
    simultaneously adjusting the planar orientation of the solar panel and the smart phone, based at least partly on the direction the smart phone is pointing.

3. A method according to claim 1, wherein the method comprises:
    receiving in the input signaling control information to initiate a digital gyroscope algorithm in the signal processor in order to determine a spatial orientation of the smart phone;
    providing in the display imaging signaling generated from the screen spatial orientation imaging containing information about the spatial orientation of the smart phone;
    simultaneously adjusting the planar orientation of the solar panel and the smart phone, based at least partly on the spatial orientation of the smart phone.

4. A method according to claim 1, wherein the method comprises:
    receiving in the smart phone global positioning satellite (GPS) signaling containing information about the global position of the smart phone;
    receiving in the input signaling control information to initiate an intuitive graphical user interface algorithm in the signal processor in order to determine visual and audio cues for a user on a proper alignment of the solar panel for optimal solar efficiency;
    providing in the display imaging signaling generated from the forward-facing screen and audio signaling generated from a speaker in the smart phone information about the visual and audio cues for the user on the proper alignment of the solar panel for optimal solar energy collection efficiency; and
    simultaneously adjusting the planar orientation of the solar panel and the smart phone, based at least partly on the visual and audio cues.

5. A method according to claim 4, wherein the method comprises
    receiving in the input signaling information about a calendar duration of a placement of the solar panel, and control information to initiate a digital gyroscope algorithm in the signal processor in order to determine a spatial orientation of the smart phone;
    determining and identifying with the intuitive graphical user interface algorithm running in the signal processor a determined placement of high efficiency for the solar panel, based at least partly on the geographic location of the smart phone, the spatial orientation of the smart phone and the calendar duration of the placement of the solar panel;
    providing in the display imaging signaling generated from the screen information about the determined placement of the solar panel; and
    simultaneously adjusting the planar orientation of the solar panel and the smart phone, based at least partly on the determined placement of the solar panel.

6. A method according to claim 1, wherein the method comprises:
    receiving in the smart phone global positioning satellite (GPS) signaling containing information about the global position of the smart phone, and
    receiving in the input signaling information about a selected time period and control information to initiate one or more celestial algorithms in the signal processor in order to determine an optimal orientation of the solar panel, based at least partly on the selected time period and a particular GPS location;
    providing in the display imaging signaling generated from the screen information about the optimal orientation of the solar panel; and
    simultaneously adjusting the planar orientation of the solar panel and the smart phone, based at least partly on the optimal orientation of the solar panel.

7. A method according to claim 1, wherein the method comprises
    receiving in the input signaling information about obstructions impinging on sunlight that are drawn on the screen by the user and control information to initiate a power calculating algorithm in the signal processor in order to determine a debit in power that would be generated by the solar panel due to the obstruction's impingement on the sunlight; and providing in the display imaging signaling generated from the screen information about the debit in power.

8. A method according to claim 1, wherein the method comprises:

receiving in the smart phone global positioning satellite (GPS) signaling containing information about the global position of the smart phone;

receiving in the input signaling information about one or more selected calendar dates and control information to initiate a customized power calculating algorithm in the signal processor to determine an expected power output generated by the solar panel;

receiving in the signal processor internal solar irradiation database signaling containing information about solar irradiation, and panel specification signaling containing information about panel specifications of the solar panel;

determining in the signal processor using the power calculating algorithm the expected power output generated by the solar panel, based at least partly on solar irradiation, panel specifications, geographic position, and the one or more selected calendar dates; and providing in the display imaging signaling generated from the screen information about the expected power output generated by the solar panel.

9. A method according to claim 8, wherein the method comprises:

receiving in the input signaling information about a current month and day, or a total time selected, or both;

determining in the signal processor using the power calculating algorithm the expected power output generated by the solar panel, based at least partly on the current month and day, or a total time selected, or both; and providing in the display imaging signaling generated from the screen information about the expected power output generated by the solar panel for the current month and day, or a total time selected, or both.

10. A method according to claim 9, wherein the method comprises:

providing in the display imaging signaling generated from the screen graphs containing information about the expected power output generated by the solar panel for the current month and day, or a total time selected, or both.

11. A method according to claim 1, wherein the method comprises:

receiving in the input signaling information about requesting that a main menu screen be displayed having one or more icons for initiating a graphical user interface algorithm in the signal processor related to features of the graphical user interface algorithm; and providing in the display imaging signaling generated from the screen information about the main menu screen having the one or more icons.

12. A method according to claim 11, wherein the method comprises:

receiving in the input signaling information about a request to create, delete or edit one or more parameters related to the solar panel; and providing in the display imaging signaling generated from the screen information about a panel screen having panel screen icons for initiating the graphical user interface algorithm in the signal processor to create, delete or edit the one or more parameters related to the solar panel.

13. A method according to claim 12, wherein the method comprises:

receiving in the input signaling information about a request for a panel setup; and providing in the display imaging signaling generated from the screen information about a panel setup screen having panel setup screen icons for initiating the graphical user interface algorithm in the signal processor to guide a user through the panel setup for determining an optimal solar panel position, based at least partly on both local geographical coordinates and a chosen time period.

14. A method according to claim 12, wherein the method comprises:

receiving in the input signaling information about a selected panel, location, orientation and period of time related to the solar panel and information for initiating a power output algorithm in the signal processor to determine an estimated power output from the solar panel;

determining in the signal processor using the power output algorithm the estimated power output from the solar panel, based at least partly on the selected panel, location, orientation and period of time; and providing in the display imaging signaling generated from the screen information about the estimated power output from the solar panel.

15. A smart phone for using to optimize the energy production of a solar panel in real time by a user comprising:

a forward-facing camera, a forward-facing screen and a flat back surface, and a signal processor or signal processing module, the signal processor or signal processing module configured at least to:

receive global positioning satellite (GPS) signaling containing information about the global position of the smart phone, and input signaling containing control information to initiate a graphical user interface algorithm in the signal processor or signal processing module for implementing camera functionality for receiving imaging using the forward-facing camera and providing corresponding display imaging signaling from the forward-facing screen corresponding to the imaging received by the forward-facing camera in order to determine visual cues, or audio cues, or both visual and audio cues for a user on a proper alignment of a solar panel for optimal solar energy collection efficiency; and provide display imaging signaling generated from a screen of the smart phone, or audio signaling generated from a speaker in the smart phone, or both the display imaging signaling and the audio signaling, containing information about the visual cues, or the audio cues, or both the visual and audio cues, for the user on the proper alignment of the solar panel for optimal solar efficiency, so as to enable the user to simultaneously adjust the planar orientation of the solar panel having the smart phone placed thereon, based at least partly on some combination of the visual cues, or the audio cues, or both the visual and audio cues, which include the following steps:

place the flat back surface of the smart phone on a flat front surface of a solar panel of a solar device;

simultaneously adjust the planar orientation of the solar panel and the smart phone into at least two positions in order to show visual obstruction in the display imaging signaling provided from the forward-facing screen of the smart phone that may at least partly block sunlight from being received by the solar panel;

select a position from the at least two positions in order to minimize the visual obstruction in the display imaging signaling provided from the forward-facing screen of the smart phone that may at least partly block sunlight from being received by the solar panel; and remove the smart phone from the solar panel so that the solar panel may receive the sunlight with minimal physical obstruction that may otherwise block the sunlight from being received by the solar panel in the position selected.

16. A smart phone according to claim 15, wherein the signal processor or signal processing module is configured to
receive in the input signaling information about a calendar duration of a placement of the solar panel, and information about a planar orientation of the smart phone;
determine and identify with the graphical user interface algorithm running in the signal processor a determined placement of high efficiency for the solar panel, based at least partly on the geographic location of the smart phone, the planar orientation of the smart phone and the calendar duration of the placement of the solar panel; and
provide in the display imaging signaling generated from the screen information about the determined placement of the solar panel in order for the user to simultaneously adjust the planar orientation of the solar panel and the smart phone, based at least partly on the determined placement of the solar panel.

17. A smart phone according to claim 15, wherein the signal processor or signal processing module is configured to
receive in the input signaling information about a selected time period and control information to initiate one or more celestial algorithms in the signal processor in order to determine an optimal orientation of the solar panel, based at least partly on the selected time period and a particular GPS location; and
provide in the display imaging signaling generated from the screen information about the optimal orientation of the solar panel in order for the user to simultaneously adjust the planar orientation of the solar panel and the smart phone, based at least partly on the optimal orientation of the solar panel.

18. A smart phone according to claim 15, wherein the signal processor or signal processing module is configured to
receive in the input signaling information about obstructions impinging on sunlight that are drawn on the screen by the user and control information to initiate a power calculating algorithm in the signal processor in order to determine a debit in power that would be generated by the solar panel due to the obstruction's impingement on the sunlight; and
provide in the display imaging signaling generated from the screen information about the debit in power.

19. A smart phone according to claim 15, wherein the signal processor or signal processing module is configured to
receive in the input signaling information about one or more selected calendar dates and control information to initiate a customized power calculating algorithm for a particular solar panel in the signal processor to determine an expected power output generated by the particular solar panel;
receive in the signal processor internal solar irradiation database signaling containing information about solar irradiation, and panel specification signaling containing information about panel specifications of the particular solar panel;
determine in the signal processor using the power calculating algorithm the expected power output generated by the particular solar panel, based at least partly on solar irradiation, panel specifications, geographic position, and the one or more selected calendar dates; and
provide in the display imaging signaling generated from the screen information about the expected power output generated by the solar panel.

20. A smart phone according to claim 19, wherein the signal processor or signal processing module is configured to
receive in the input signaling information about a current month and day, or a total time selected, or both;
determine in the signal processor using the power calculating algorithm the expected power output generated by the solar panel, based at least partly on the current month and day, or a total time selected, or both; and
provide in the display imaging signaling generated from the screen information about the expected power output generated by the solar panel for the current month and day, or a total time selected, or both.

21. A smart phone according to claim 19, wherein the signal processor or signal processing module is configured to provide in the display imaging signaling generated from the screen graphs containing information about the expected power output generated by the solar panel for the current month and day, or a total time selected, or both.

22. A smart phone according to claim 15, wherein the signal processor or signal processing module is configured to
receive in the input signaling information about requesting that a main menu screen be displayed having one or more icons for initiating a graphical user interface algorithm in the signal processor related to features of the graphical user interface algorithm; and
provide in the display imaging signaling generated from the screen information about the main menu screen having the one or more icons.

23. A smart phone according to claim 22, wherein the signal processor or signal processing module is configured to
receive in the input signaling information about a request to create, delete or edit one or more parameters related to the solar panel; and
provide in the display imaging signaling generated from the screen information about a panel screen having panel screen icons for initiating the graphical user interface algorithm in the signal processor to create, delete or edit the one or more parameters related to the solar panel.

24. A smart phone according to claim 23, wherein the signal processor or signal processing module is configured to
receive in the input signaling information about a request for a panel setup; and
provide in the display imaging signaling generated from the screen information about a panel setup screen having panel setup screen icons for initiating the graphical user interface algorithm in the signal processor to guide a user through the panel setup for determining an optimal solar panel position, based at least partly on both local geographical coordinates and a chosen time period.

25. A smart phone according to claim 23, wherein the signal processor or signal processing module is configured to
receive in the input signaling information about a selected panel, location, orientation and period of time related to the solar panel and information for initiating a power output algorithm in the signal processor to determine an estimated power output from the solar panel;
determine in the signal processor using the power output algorithm the estimated power output from the solar panel, based at least partly on the selected panel, location, orientation and period of time; and provide in the display imaging signaling generated from the screen information about the estimated power output from the solar panel.

26. A smart phone according to claim 15, wherein the graphical user interface algorithm is, or forms part of, an app for the smart phone.

27. A method for using a smart phone having a forward-facing camera, a forward-facing screen and a flat back surface, and a signal processor or signal processing module to optimize the energy production of a solar panel in real time by a user, based at least partly on a flowchart or computer program algorithm for implementing signal processing comprising at least the steps of:

receiving in a smart phone global positioning satellite (GPS) signaling containing information about the global position of the smart phone, and input signaling containing control information to initiate an intuitive graphical user interface algorithm in the signal processor or signal processing module in the smart phone for implementing camera functionally for receiving imaging using the forward-facing camera and providing corresponding display imaging signaling from the forward-facing screen corresponding to the imaging received by the forward-facing camera in order to determine visual cues, or audio cues, or both visual and audio cues, for a user on a proper alignment of the solar panel for optimal solar energy collection efficiency; and providing in display imaging signaling generated from a screen of the smart phone, or audio signaling generated from a speaker of the smart phone, or both the display imaging signaling and the audio signaling, information about the visual cues, or the audio cues, or both the visual and audio cues, for the user on the proper alignment of the solar panel for optimal solar energy collection efficiency, so as to enable the user to simultaneously adjust the planar orientation of the solar panel having the smart phone placed thereon, based at least partly on some combination of the visual cues, or the audio cues, or both the visual cues and audio cues, which include the following steps:

place the flat back surface of the smart phone on a flat front surface of a solar panel of a solar device;

simultaneously adjust the planar orientation of the solar panel and the smart phone into at least two positions in order to show visual obstruction in the display imaging signaling provided from the forward-facing screen of the smart phone that may at least partly block sunlight from being received by the solar panel;

select a position from the at least two positions in order to minimize the visual obstruction in the display imaging signaling provided from the forward-facing screen of the smart phone that may at least partly block sunlight from being received by the solar panel; and remove the smart phone from the solar panel so that the solar panel may receive the sunlight with minimal physical obstruction that may otherwise block the sunlight from being received by the solar panel in the position selected.

28. A method according to claim 27, wherein the method comprises receiving in the input signaling information about a calendar duration of a placement of the solar panel, and control information to initiate a digital gyroscope algorithm in the signal processor or signal processing module in order to determine a spatial orientation of the smart phone;

determining and identifying with the intuitive graphical user interface algorithm running in the signal processor a determined placement of high efficiency for the solar panel, based at least partly on the geographic location of the smart phone, the spatial orientation of the smart phone and the calendar duration of the placement of the solar panel;

providing in the display imaging signaling generated from the screen information about the determined placement of the solar panel, so as to enable the user to simultaneously adjust the planar orientation of the solar panel and the smart phone, based at least partly on the determined placement of the solar panel.

29. A method according to claim 27, wherein the method comprises:

receiving in the input signaling information about a selected time period and control information to initiate one or more celestial algorithms in the signal processor or signal processing module in order to determine an optimal orientation of the solar panel, based at least partly on the selected time period and a particular GPS location;

providing in the display imaging signaling generated from the screen information about the optimal orientation of the solar panel, so as to enable the user to simultaneously adjust the planar orientation of the solar panel and the smart phone, based at least partly on the optimal orientation of the solar panel.

30. A method according to claim 27, wherein the method comprises receiving in the input signaling information about obstructions impinging on sunlight that are drawn on the screen by the user and control information to initiate a power calculating algorithm in the signal processor or signal processing module in order to determine a debit in power that would be generated by the solar panel due to the obstruction's impingement on the sunlight; and providing in the display imaging signaling generated from the screen information about the debit in power.

31. A method according to claim 27, wherein the method comprises:

receiving in the input signaling information about one or more selected calendar dates and control information to initiate a customized power calculating algorithm in the signal processor or signal processing module to determine an expected power output generated by the solar panel;

receiving in the signal processor or signal processing module internal solar irradiation database signaling containing information about solar irradiation, and panel specification signaling containing information about panel specifications of the solar panel;

determining in the signal processor or signal processing module using the power calculating algorithm the expected power output generated by the solar panel, based at least partly on solar irradiation, panel specifications, geographic position, and the one or more selected calendar dates; and providing in the display imaging signaling generated from the screen information about the expected power output generated by the solar panel.

32. A method according to claim 31, wherein the method comprises:

receiving in the input signaling information about a current month and day, or a total time selected, or both;

determining in the signal processor or signal processing module using the power calculating algorithm the expected power output generated by the solar panel, based at least partly on the current month and day, or a total time selected, or both; and providing in the display imaging signaling generated from the screen information about the expected power output generated by the solar panel for the current month and day, or a total time selected, or both.

33. A method according to claim 32, wherein the method comprises:
providing in the display imaging signaling generated from the screen graphs containing information about the expected power output generated by the solar panel for the current month and day, or a total time selected, or both.

34. A method according to claim 27, wherein the method comprises:
receiving in the input signaling information about requesting that a main menu screen be displayed having one or more icons for initiating a graphical user interface algorithm in the signal processor or signal processing module related to features of the graphical user interface algorithm; and
providing in the display imaging signaling generated from the screen information about the main menu screen having the one or more icons.

35. A method according to claim 34, wherein the method comprises:
receiving in the input signaling information about a request to create, delete or edit one or more parameters related to the solar panel; and
providing in the display imaging signaling generated from the screen information about a panel screen having panel screen icons for initiating the graphical user interface algorithm in the signal processor to create, delete or edit the one or more parameters related to the solar panel.

36. A method according to claim 35, wherein the method comprises:
receiving in the input signaling information about a request for a panel setup; and
providing in the display imaging signaling generated from the screen information about a panel setup screen having panel setup screen icons for initiating the graphical user interface algorithm in the signal processor to guide a user through the panel setup for determining an optimal solar panel position, based at least partly on both local geographical coordinates and a chosen time period.

37. A method according to claim 35, wherein the method comprises:
receiving in the input signaling information about a selected panel, location, orientation and period of time related to the solar panel and information for initiating a power output algorithm in the signal processor to determine an estimated power output from the solar panel;
determining in the signal processor or signal processing module using the power output algorithm the estimated power output from the solar panel, based at least partly on the selected panel, location, orientation and period of time; and
providing in the display imaging signaling generated from the screen information about the estimated power output from the solar panel.

* * * * *